United States Patent
Moon et al.

(10) Patent No.: US 9,674,903 B2
(45) Date of Patent: Jun. 6, 2017

(54) COOKING APPARATUS AND OPERATING METHOD THEREOF

(75) Inventors: Hyun Wook Moon, Seoul (KR); Jae Kyung Yang, Seoul (KR); Sung Hun Sim, Seoul (KR); Heung Sik Choi, Seoul (KR); Wan Soo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1218 days.

(21) Appl. No.: 13/699,822

(22) PCT Filed: May 26, 2011

(86) PCT No.: PCT/KR2011/003851
§ 371 (c)(1),
(2), (4) Date: Mar. 21, 2013

(87) PCT Pub. No.: WO2011/149276
PCT Pub. Date: Dec. 1, 2011

(65) Prior Publication Data
US 2013/0168388 A1    Jul. 4, 2013

(30) Foreign Application Priority Data
May 26, 2010 (KR) .................. 10-2010-0049253

(51) Int. Cl.
H05B 6/68 (2006.01)
H05B 6/70 (2006.01)

(52) U.S. Cl.
CPC .............. *H05B 6/68* (2013.01); *H05B 6/705* (2013.01); *Y02B 40/146* (2013.01)

(58) Field of Classification Search
CPC ......... H05B 6/705; H05B 6/68; Y02B 40/146

USPC ....... 219/678, 696, 700, 702, 703, 709, 748, 219/756
See application file for complete search history.

(56) References Cited

U.S. PATENT DOCUMENTS

| 2010/0176121 A1* | 7/2010 | Nobue | H05B 6/686 219/716 |
| 2010/0224623 A1* | 9/2010 | Yasui | H05B 6/686 219/702 |

FOREIGN PATENT DOCUMENTS

| JP | 06-215870 | 8/1994 |
| JP | 09-049635 | 2/1997 |
| JP | 2007-227134 | 9/2007 |

(Continued)

OTHER PUBLICATIONS

International Search Report issued in PCT Application No. PCT/KR2011/003851 dated Feb. 16, 2012.
(Continued)

*Primary Examiner* — Thien S Tran
(74) *Attorney, Agent, or Firm* — Ked & Associates LLP (57) ABSTRACT

Provided herein are a cooking apparatus. The cooking apparatus includes a cavity, and a microwave generator to generate and output microwaves of a plurality of frequencies to heat an object within the cavity, wherein the microwave generator includes a controller to calculate heating efficiencies based on microwaves reflected by the inside of the cavity from among the output microwaves and to calculate heating modes consisting of microwaves for heating, during a scanning session and to control the heating modes so as to achieve the equal heating time during a heating session. Thereby, the object within the cavity is uniformly heated.

15 Claims, 6 Drawing Sheets

(56) References Cited

FOREIGN PATENT DOCUMENTS

| JP | 2008-034244 | 2/2008 | | |
|----|----|----|----|----|
| JP | WO 2008018466 A1 * | 2/2008 | ............. | H05B 6/686 |
| JP | WO 2009050893 A1 * | 4/2009 | ............. | H05B 6/686 |
| KR | 10-2009-0030403 | 3/2009 | | |

OTHER PUBLICATIONS

Korean Office Action dated May 18, 2016 issued in Application No. 10-2010-0049253.

* cited by examiner

COOKING APPARATUS AND OPERATING METHOD THEREOF

CROSS-REFERENCE TO RELATED PATENT APPLICATIONS

This application is a U.S. National Stage Application under 35 U.S.C. §371 of PCT Application No. PCT/KR2011/003851, filed May 26, 2011, which claims priority to Korean Patent Application No. 10-2010-0049253, filed May 26, 2010.

TECHNICAL FIELD

The present invention relates to a cooking apparatus and an operating method thereof, and more particularly to a cooking apparatus which uniformly heats an object to be cooked within a cavity and an operating method thereof.

BACKGROUND ART

In general, in a cooking apparatus using microwaves, when an operation button is pressed after food is put into a cavity and then the cavity is sealed, voltage is applied to a high-voltage transformer, the commercial voltage applied to the high-voltage transformer is boosted to high-voltage power, the power is applied to a magnetron to generate microwaves and the microwaves generated by the magnetron are transmitted to the cavity through a waveguide, etc.

Here, the cooking apparatus using microwaves heats the food using frictional force generated by vibration of molecules of the food 2,450,000,000 times per second due to irradiation of the microwaves generated by the magnetron onto the food.

Such a cooking apparatus using microwaves has advantages, such as ease of temperature control, cooking time saving, convenience in operation, etc., and thus has been broadly distributed in many households.

However, if food is cooked using microwaves, the food is not uniformly heated due to surface variation of the food and a partial temperature difference of the food may occur. Further, temperature variation during cooking may occur according to kinds of food accommodated in the cooking apparatus.

DISCLOSURE OF INVENTION

Technical Problem

Therefore, the present invention has been made in view of the above problems, and it is an object of the present invention to provide a cooking apparatus which calculates heating efficiencies based on microwaves reflected by the inside of a cavity from among microwaves of a plurality of frequencies output and then calculates heating modes consisting of microwaves for heating during a scanning session, and controls the microwaves so as to achieve the equal heating time according to heating modes by adjusting the number of the frequencies of the microwaves or the heating times of the microwaves during a heating session, thereby uniformly heat an object to be cooked within the cavity.

Solution to Problem

To achieve the above objects, there is provided a cooking apparatus according to an exemplary embodiment of the present invention, including a cavity, and a microwave generator to generate and output microwaves of a plurality of frequencies to heat an object within the cavity, wherein the microwave generator includes a controller to calculate heating efficiencies based on microwaves reflected by the inside of the cavity from among the output microwaves and to calculate heating modes consisting of microwaves for heating, during a scanning session and to control the heating modes so as to achieve the equal heating time during a heating session.

To achieve the above objects, there is provided a cooking apparatus according to an exemplary embodiment of the present invention, including a microwave generator to generate and output microwaves of a plurality of frequencies to heat an object within a cavity, and a controller to calculate heating efficiencies based on microwaves reflected by the inside of the cavity from among the output microwaves and to calculate heating modes consisting of microwaves for heating, during a scanning session and to control the heating modes so as to have the equal heating time during a heating session.

To achieve the above objects, there is provided an operating method of a cooking apparatus according to an exemplary embodiment of the present invention, including generating microwaves of a plurality of frequencies during a scanning session, outputting the generated microwaves to the inside of a cavity, calculating heating modes consisting of microwaves for heating, based on microwaves reflected by the inside of the cavity, and controlling the heating modes so as to achieve the equal heating time.

Advantageous Effects of Invention

As apparent from the above description, a cooking apparatus using microwaves in accordance with one embodiment of the present invention calculates heating efficiencies based on microwaves reflected by the inside of a cavity from among microwaves having a plurality of frequencies output and calculates heating modes consisting of microwaves for heating, during a scanning session and controls the heating modes so as to achieve the equal heating time through adjustment of the number of the frequencies of the microwaves or adjustment of heating times of the microwaves having the respective frequencies during a heating session, thereby uniformly heating an object within the cavity.

That is, the respective heating modes have the equal heating time and thus equal energy is applied in the heating modes, thereby preventing energy surplus or shortage and thus improving operation efficiency of the cooking apparatus.

BRIEF DESCRIPTION OF DRAWINGS

The above and other objects, features and other advantages of the present invention will be more clearly understood from the following detailed description taken in conjunction with the accompanying drawings, in which.

BEST MODE FOR CARRYING OUT THE INVENTION

The advantages and features of the present invention, and the way of attaining them, will become apparent with reference to embodiments described below in conjunction with the accompanying drawings.

Hereinafter, it will be understood that suffixes "module", "unit", and "part" applied to elements used in the following description are used in consideration of ease of illustration and the suffixes themselves do not have discriminative meanings or roles. Therefore, the suffixes "module", "unit", and "part" may be used interchangeably.

Figure 1:
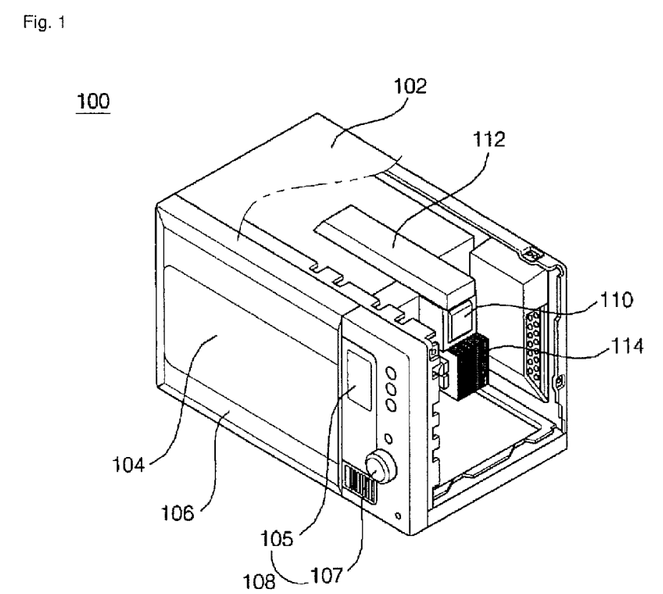
FIG. 1 is a partial perspective view of a cooking apparatus in accordance with one embodiment of the present invention.
Figure 2:
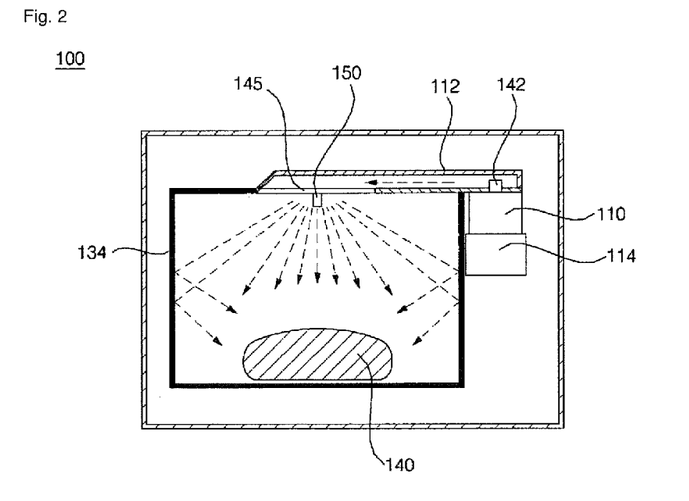
FIG. 2 is a cross-sectional view of the cooking apparatus of FIG. 1.

FIG. 1 is a partial perspective view of a cooking apparatus in accordance with one embodiment of the present invention, and FIG. 2 is a cross-sectional view of the cooking apparatus of FIG. 1.

With reference to FIGS. 1 and 2, a cooking apparatus 100 in accordance with the embodiment of the present invention is configured such that a door 106 provided with a cooking window 104 is connected to a front surface part of a main body 102 so as to be opened and closed and an operation panel 108 is connected to one side of the front surface of the main body 102.

The door 106 opens and closes a cavity 134, and a door choke (not shown) to intercept microwaves may be disposed on the inner surface of the door 106.

The operation panel 108 includes an input unit 107 to control operation of the cooking apparatus 100 and a display 105 to display the operating state of the cooking apparatus 100.

The cavity 134 having an accommodation space of a designated size is provided within the main body 102 such that an object to be heated, for example, food may be accommodated within the cavity 134 and be cooked by microwaves.

The cavity 134 is formed by bonding plates, each of which forms at least one surface, and has an approximately rectangular parallelepiped shape having an opened front surface.

For example, the cavity 134 may be formed by an upper plate forming a ceiling, a rear plate forming the rear surface of the cavity 134, a bottom plate forming the bottom surface of the cavity 134, and a side plate forming the side surfaces of the cavity 134. Further, the door 106 may be disposed on the front surface of the cavity 134. Here, a front plate forming the front surface of the cavity 134 may be formed at regions excluding the door 106.

A microwave generator 110 to generate microwaves is installed on the outer surface of the cavity 134, and a microwave transmission unit 112 to guide the microwaves generated by the microwave generator 112 to the inside of the cavity 134 is disposed at the output side of the microwave generator 110.

The microwave generator 110 may include a magnetron, a Solid State Power Amplifier (SSPA) using a semiconductor, or a Solid State Power Oscillator (SSPO) using a semiconductor.

The SSPA is advantageous in that the SSPA occupies less space than the magnetron. Further, the SSPO is advantageous in that the SSPO does not require a Voltage Controlled Oscillator (VCO) and a Voltage Controlled Attenuator (VCA) as required by the SSPA and thus occupies less space than the SSPA and has a simple circuit configuration.

The SSPA or the SSPO may be implemented as a Hybrid Microwave Integrated Circuit (HMIC) in which passive elements (capacitors, inductors, etc.) and active elements (transistors, etc.) for amplification are separately provided, or a Monolithic Microwave Integrated Circuit (MMIC) in which passive elements and active elements are integrated into one substrate.

The microwave generator 110 may be implemented as one module into which SSPAs or SSPOs are integrated, and may be referred to as a Solid State Power Module (SSPM).

In accordance with the embodiment of the present invention, the microwave generator 110 may generate and output a plurality of microwaves of different frequencies. These frequencies of the microwaves may be in the range of approximately 900 MHz-2,500 MHz. Particularly, the frequencies of the microwaves may be in a designated range around 915 MHz or in a designated range around 2,450 MHz.

The microwave transmission unit 112 transmits the microwaves generated by the microwave generator 110 to the cavity 134. Such a microwave transmission unit 112 may include a transmission line. The transmission line may be a waveguide, a microstrip line or a coaxial cable. In order to deliver the generated microwaves to the microwave transmission unit 112, a feeder 142 is connected, as shown in FIG. 2.

The microwave transmission unit 112 may include an opening 145 communicating with the inside of the cavity 134, as shown in FIG. 2.

The opening 145 may have various shapes, such as a slot. The microwaves are discharged to the cavity 134 through the opening 145.

Although the drawings illustrate one opening 145 as being disposed at the upper portion of the cavity 134, the opening 145 may be disposed at the lower portion or the side portion of the cavity 134, or a plurality of openings may be disposed.

Further, an antenna may be connected to the end of the microwave transmission unit 112.

A power supply unit 114 to supply power to the microwave generator 110 is provided under the microwave generator 110.

The power supply unit 114 includes a high-voltage transformer to boost power input to the cooking apparatus 100 to high voltage and then to supply the high voltage to the microwave generator 110, or an inverter to supply high output voltage of more than approximately 3,500V, generated through switching operation of at least one switch element, to the microwave generator 110.

A cooling fan (not shown) to cool the microwave generator 110 may be installed around the microwave generator 110.

A resonance mode conversion unit (not shown) to convert a resonance mode in the cavity 134 may be disposed. For example, the resonance mode conversion unit (not shown) may include at least one of a stirrer, a rotating table, a sliding table and a Field Adjustment Element (FAE). Among these, the rotating table and the sliding table may be disposed at the lower portion of the cavity 134, and the stirrer may be disposed at various positions, i.e., lower, side and upper positions, of the cavity 134.

In the above-described cooking apparatus 100, after a user opens the door 106 and puts an object 140 to be heated into the cavity 134, when the user closes the door 106, or closes the door 106 and operates the operation panel 108, particularly the input unit 107, and then presses a start button (not shown), the cooking apparatus 100 is operated.

That is, the power supply unit 114 in the cooking apparatus 100 boosts input AC power to high-voltage DC power and then supplies the high-voltage DC power to the microwave generator 110, the microwave generator 110 generates and outputs corresponding microwaves, and the microwave transmission unit 112 transmits the generated microwaves so as to discharge the microwaves to the inside of the cavity 134. Thereby, the object 140 to be heated, for example, food located within the cavity 134, is heated.

Figure 3:
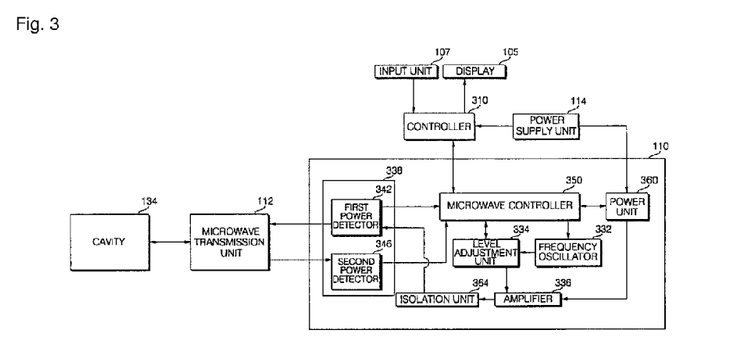
FIG. 3 is a block diagram briefly illustrating one example of the inside of the cooking apparatus of FIG. 1.

FIG. 3 is a block diagram briefly illustrating one example of the inside of the cooking apparatus of FIG. 1.

With reference to FIG. 3, the cooking apparatus 100 in accordance with the embodiment of the present invention includes the microwave generator 110, the microwave transmission unit 112, the cavity 134, a controller 310 and the power supply unit 114.

The microwave generator 110 includes a frequency oscillator 332, a level adjustment unit 334, an amplifier 336, a directional coupler 338, a first power detector 342, a second power detector 346, a microwave controller 350, a power unit 360 and an isolation unit 364. The microwave generator 110 implemented as the SSPA will be exemplarily described.

In the above elements, two or more elements may be combined into one element, or one element may be divided into two or more elements, as needed in actual applications.

The frequency oscillator 332 oscillates and outputs microwaves of a corresponding frequency by a frequency control signal from the microwave controller 350. The frequency oscillator 332 may include a Voltage Controlled Oscillator (VCO). The VCO oscillates the corresponding frequency according to a voltage level of the frequency control signal. For example, as the voltage level of the frequency control signal is higher, the frequency oscillated and generated by the VCO is higher.

The level adjustment unit 334 oscillates and outputs the microwaves, having being oscillated and output by the frequency signal of the frequency oscillator 332, with corresponding power according to a power control signal. The level adjustment unit 334 may include a Voltage Controlled Attenuator (VCA).

The VCA performs a compensation operation so as to output the microwaves with corresponding power according to the voltage level of the power control signal. For example, as the voltage level of the power control signal is higher, the power level of the signal output from the VCA is higher.

The amplifier 336 amplifies, based on the frequency signal oscillated by the frequency oscillator 332 and the power control signal generated by the level adjustment unit 334, the oscillated frequency signal and then outputs microwaves.

The Directional Coupler (DC) 338 transmits the microwaves amplified and output from the amplifier 336 to the microwave transmission unit 112. The microwaves output from the microwave transmission unit 112 heat the object in the cavity 134.

Microwaves, which are not absorbed by the object in the cavity 134, instead being reflected by the object, may be input to the DC 338 through the microwave transmission unit 112. The DC 338 transmits the reflected microwaves to the microwave controller 350.

The DC 338 may include the first power detector 342 to detect power of output microwaves and the second power detector 346 to detect power of reflected microwaves. The first power detector 342 and the second power detector 346 may be disposed between the DC 338 and the microwave controller 350, and be disposed on the DC 338 on a circuit.

The first power detector 342 detects output power of microwaves amplified by the amplifier 336 and transmitted to the microwave transmission unit 112 via the DC 338. The detected power signal is input to the microwave controller 350 and is used in heating efficiency calculation. The first power detector 342 may include a resistor, a Schottky diode element, etc. for power detection.

On the other hand, the second power detector 346 detects power of microwaves reflected by the inside of the cavity 134 and received by the DC 338. The detected power signal is input to the microwave controller 350 and is used in heating efficiency calculation. The second power detector 346 may include a resistor, a Schottky diode element, etc. for power detection.

The microwave controller 350 is operated by drive power supplied from the power unit 360 of the microwave generator 110. The microwave controller 350 may control operation of the elements of the microwave generator 110 in communication with the controller 310.

The microwave controller 350 calculates heating efficiencies based on microwaves, which are not absorbed by the object, instead being reflected by the object, from among the microwaves discharged to the inside of the cavity 134.

$$h_e = \frac{P_t - P_r}{P_t} \qquad \text{[Equation 1]}$$

Here, $P_t$ represents power of microwaves discharged to the inside of the cavity 134, $P_r$ represents power of microwaves reflected by the inside of the cavity 134, and $h_e$ represents heating efficiency of microwaves.

According to Equation 1 above, as the power of the reflected microwaves is higher, the heating efficiency $h_e$ is smaller.

If microwaves of a plurality of frequencies are discharged to the inside of the cavity 134, the microwave controller 350 calculates heating efficiencies $h_e$ of the microwaves according to frequencies. Such heating efficiency calculation may be performed throughout the entire cooking session according to the embodiment of the present invention.

In order to effectively achieve heating, the entire cooking session may be divided into a scanning session and a heating session. During the scanning session, the microwaves of the plurality of frequencies are sequentially discharged to the inside of the cavity 134, and heating efficiencies are calculated based on reflected microwaves. Further, during the heating session, the microwaves are output for different output times according to frequencies or only microwaves of a designated frequency are output, based on the heating efficiencies calculated during the scanning session. Preferably, power of the microwaves during the heating session is considerably greater than power of the microwaves during the scanning session.

The microwave controller 350 generates and outputs a frequency control signal so as to vary the output times of the microwaves according to the calculated heating efficiencies. The frequency oscillator 332 oscillates a corresponding frequency according to the input frequency control signal.

The microwave controller 350 generates the frequency control signal so that, if the calculated heating efficiency $h_e$ is high, the output time of the corresponding microwaves becomes short. That is, while the microwaves of the plurality of frequencies are sequentially swept, output times of the microwaves of the plurality of frequencies may be varied according to the calculated heating efficiencies. That is, as the heating efficiency $h_e$ is higher, the corresponding output time is preferably shorter. Thereby, the microwaves may be uniformly absorbed by the object to be heated within the cavity 134 according to frequencies, and thus uniformly heat the object.

On the other hand, the microwave controller 350 may control the microwaves such that the microwaves of the corresponding frequencies are output, only if the calculated heating efficiencies $h_e$ according to the frequencies are more than a set reference heating efficiency. That is, microwaves of frequencies having low heating efficiencies $h_e$ are excluded from an actual heating time, and thereby may effectively and uniformly heat the object.

The microwave controller 350, the power unit 360, the frequency oscillator 332, the level adjustment unit 334, the amplifier 336, the DC 338, the first power detector 342 and the second power detector 346 of the above-described microwave generator 110 may be integrated into one module. That is, these elements may be disposed on a single substrate so as to be integrated into one module.

The microwave controller 350 may calculate heating efficiencies of the microwaves according to frequencies, based on microwaves, which are not absorbed by food in the cavity 134, instead being reflected by the food, from among the microwaves discharged to the inside of the cavity 134, and calculates microwaves of frequencies, the calculated heating efficiencies of which are more than the set reference heating efficiency. Further, the microwave controller 350 calculates microwave frequencies, and calculates heating times of the calculated microwave frequencies. For example, if heating efficiency is more than the set reference heating efficiency, as the heating efficiency is higher, the heating time of the microwaves of the corresponding frequency is shorter. Thereby, the object may be uniformly heated.

The microwave controller 350 may control the frequency oscillator 332 and the level adjustment unit 334 so as to output microwaves to heat the food in the cavity to the inside of the cavity 134 based on the calculated heating efficiencies. Preferably, power of microwaves output to the cavity 134 during heating is considerably greater than power of microwaves output to the cavity 134 during measurement of the heating efficiencies.

If the heating efficiency, calculated based on the microwaves reflected by the inside of the cavity 134 from among the output microwaves, is below a reference efficiency during the heating session, the microwave controller 350 may control the microwave generator 110 so as to stop output of the microwaves of the corresponding frequency and to output the microwaves of the next frequency. Thereby, heating may be effectively performed.

Further, the microwave controller 350 may calculate heating efficiencies of the microwaves of the plurality of frequencies, based on the microwave frequencies reflected by the inside of the cavity 134 from among the microwaves output from the amplifier 336, and may set heating times of the respective microwaves during the heating session according to the calculated heating efficiencies.

For example, if, from among the microwaves of the plurality of frequencies, heating efficiency of microwaves of a first frequency is higher than heating efficiency of microwaves of a second frequency, the microwave controller 350 may set heating time of the microwaves of the first frequency to be shorter than heating time of the microwaves of the second frequency.

The microwave controller 350 may output the same power control signal for the microwaves of the respective frequencies to the microwave generator 110 during heating. Further, the level adjustment unit 334 may output a regular power level according to the input power control signal.

The power unit 360 supplies drive power to the elements of the microwave generator 110. The power unit 360 supplies drive power to the microwave controller 350 and the amplifier 336. The power unit 360 receives external power supplied from the power supply unit 114, performs regulation of the external power, and then supplies the regulated power to the inside of the microwave generator 110.

The isolation unit 364 is disposed between the amplifier 336 and the DC 338, passes microwaves amplified by the amplifier 336 if the amplified microwaves are transmitted to the cavity 134, and intercepts microwaves reflected by the inside of the cavity 134. The isolation unit 364 may include an isolator. The microwaves reflected by the inside of the cavity 134 are absorbed by a resistor in the isolation unit 364 and thus do not enter the amplifier 336. Thereby, entry of the reflected microwaves to the amplifier 336 is prevented.

The microwave transmission unit 112 transmits a plurality of microwave frequencies generated and output from the microwave generator 110 to the cavity 134. Such a microwave transmission unit 112 may include a transmission line. The transmission line may be a waveguide, a microstrip line or a coaxial cable.

In order to deliver the generated microwaves to the microwave transmission unit 112, the feeder 142 is connected, as shown in FIG. 2.

The controller 310 controls the overall operation of the cooking apparatus 100 in response to a signal received from the input unit 107. The controller 310 communicates with the microwave controller 350 of the microwave generator 110, thus controlling operation of the elements of the microwave generator 110. The controller 310 controls the display 105 so as to display current operation, remaining cooking time, a kind of food to be cooked, etc. of the cooking apparatus 100 to the outside.

The power supply unit 114 may include a high-voltage transformer to boost power input to the cooking apparatus 100 to a high voltage and then to supply the high voltage to the microwave generator 110, or an inverter to supply high output voltage of more than approximately 3,500V, generated through switching operation of at least one switch element, to the microwave generator 110. Further, the power supply unit 114 supplies drive voltage to the controller 310.

The block diagram of the cooking apparatus 100 shown in FIG. 3 is a block diagram in accordance with the embodiment of the present invention. The respective elements of the block diagrams may be integrated, added, or omitted according to specifications of the actually implemented cooking apparatus 100. That is, two or more elements may be combined into one element, or one element may be divided into two or more elements, as needed. Further, functions performed by respective blocks are provided to describe the embodiment of the present invention, and detailed operations or devices thereof do not limit the scope of the invention.

Figure 4:
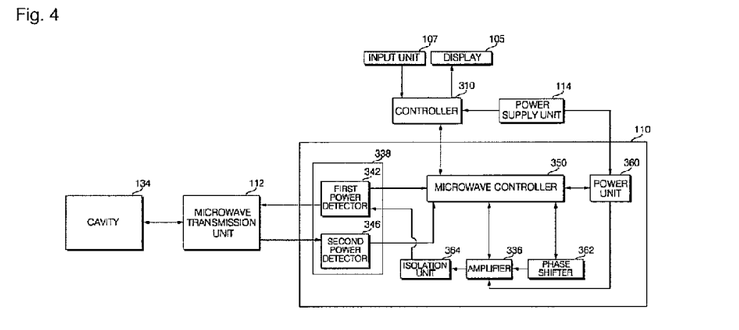
FIG. 4 is a block diagram briefly illustrating another example of the inside of the cooking apparatus of FIG. 1.

FIG. 4 is a block diagram briefly illustrating another example of the inside of the cooking apparatus of FIG. 1.

With reference to FIG. 4, differing from the microwave generator 110 of FIG. 3, the microwave generator 110 implemented as the SSPO will be exemplarily described.

A detailed description of elements of FIG. 4, which are substantially the same as those of FIG. 3, will be omitted.

In accordance with the embodiment of the present invention, the microwave generator 110 may include the microwave controller 350, the power unit 360, a phase shifter 362, the amplifier 336, the isolation unit 364 and the Directional Coupler (DC) 338.

The DC 338 may include the first power detector 342 and the second power detector 346, as described above.

The microwave generator 110 of FIG. 4 differs from the microwave generator 110 of FIG. 3 in that the microwave generator 110 of FIG. 4 excludes the frequency oscillator 322 and the level adjustment unit 334 of the microwave generator 110 of FIG. 3 and additionally includes the phase shifter 362. Therefore, differing from the microwave generator 110 of FIG. 3, the microwave controller 350 controls the amplifier 336 so as to output microwaves to heat food in the cavity 134, based on calculated heating efficiencies he, to the inside of the cavity 134.

The amplifier 336 receives DC power supplied from the power supply unit 360, and performs frequency oscillation and amplification for itself. That is, the amplifier 336 performs frequency oscillation and performs amplification operation for itself based on received DC power without a separate frequency oscillator to generate and output a frequency oscillation signal.

The amplifier 336 may include at least one RF power transistor. If a plurality of RF power transistors is used, the plural RF power transistors may be connected in series, in parallel, or through combination of series connection and parallel connection so as to achieve multi-stage amplification. For example, such an amplifier 336 may be an RF power transistor. Further, output of the amplifier 336 may be approximately 100 to 1,000 W.

The phase shifter 362 feeds back output of the amplifier 336, thus achieving phase shift. A phase shift amount may be adjusted by a phase control signal of the microwave controller 350. The phase shifter 362 achieves phase shift of an amplification signal of a designated frequency output from the amplifier 336, thereby generating microwaves of various frequencies, as described above. For example, the number of frequencies may be increased in proportion to the phase shift amount.

Preferably, a signal corresponding to approximately 1% to 2% of an amplification signal level of a designated frequency may be sampled and input to the phase shifter 362. This is done in consideration of re-amplification in the amplifier 336 after feedback.

Next, the isolation unit 364 re-supplies the signal, the phase of which has been shifted by the phase shifter 362, to the amplifier 336. If the level of the signal, the phase of which has been shifted by the phase shifter 362, is below a set value, the isolation unit 364 may supply the signal, the phase of which has been shifted, to a ground terminal instead of to the amplifier 336.

The signal supplied by the isolation unit 364 is re-amplified by the amplifier 336. Thereby, microwaves of a plurality of different frequencies are sequentially output.

As described above, since the amplifier 336 performs frequency oscillation and amplification for itself, the microwave generator 110 may be formed in a simple structure. Further, microwaves of a plurality of frequencies may be generated and output using the phase shifter 362.

Figure 5:
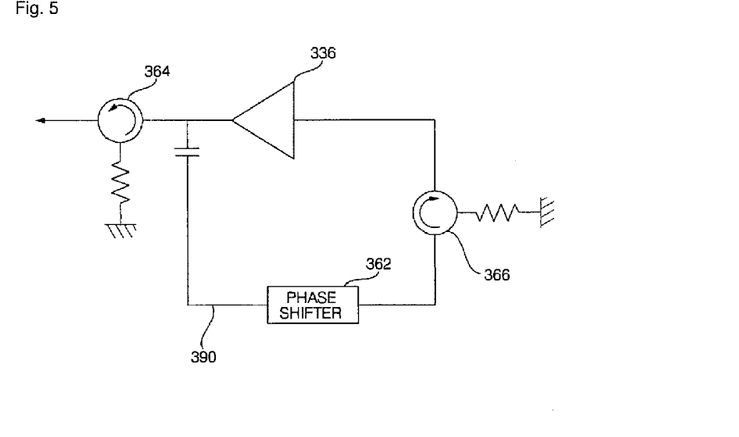
FIG. 5 is a circuit diagram briefly illustrating the inside of a solid state power oscillator of FIG. 4.

FIG. 5 is a circuit diagram briefly illustrating the inside of the SSPO of FIG. 4.

With reference to FIG. 5, the SSPO may include the amplifier 336, the phase shifter 362, the first isolation unit 364 and a second isolation unit 366.

The amplifier 336 receives DC power from the power unit 360, and performs frequency oscillation and amplification for itself. That is, the amplifier 336 performs frequency oscillation and performs amplification operation for itself according to receipt of DC power without a separate frequency oscillator to generate and output a frequency oscillation signal.

The amplifier 336 may include at least one RF power transistor. If a plurality of RF power transistors is used, the plural RF power transistors may be connected in series, in parallel, or through combination of series connection and parallel connection so as to achieve multi-stage amplification. For example, such an amplifier 336 may be an RF power transistor. Further, output of the amplifier 336 may be approximately 100 to 1,000 W.

Next, the phase shifter 362 may feed back output of the amplifier 336, thus achieving phase shift. A phase shift amount may be adjusted by a phase control signal of the microwave controller 350. The phase shifter 362 may achieve phase shift of an amplification signal of a designated frequency output from the amplifier 336, thereby generating microwaves of various frequencies, as described above. For example, the number of frequencies may be increased in proportion to the phase shift amount.

Preferably, a signal corresponding to approximately 1% to 2% of an amplification signal level of a designated frequency is sampled and input to the phase shifter 362. This is done in consideration of re-amplification in the amplifier 336 after feedback.

The first isolation unit 364 is located between the amplifier 336 and the DC 338, and transmits the microwaves of the plurality of different frequencies, sequentially output from the amplifier 336, to the microwave transmission unit 112. In more detail, the first isolation unit 364 supplies the microwaves to the microwave transmission unit 112 via the DC 338. If a signal level of the microwaves supplied from the amplifier 336 is below a set value, the first isolation unit 364 may supply the microwaves to a ground terminal instead of to the microwave transmission unit 112.

Next, the second isolation unit 366 re-supplies the signal, the phase of which has been shifted by the phase shifter 362, to the amplifier 336. If the level of the signal, the phase of which has been shifted by the phase shifter 362, is below a set value, the second isolation unit 366 may supply the signal, the phase of which has been shifted, to a ground terminal instead of to the amplifier 336.

The signal supplied by the second isolation unit 366 is re-amplified by the amplifier 336. Thereby, microwaves of a plurality of different frequencies are sequentially output.

A feedback transmission line 390 serves to connect the output terminal of the amplifier 336 to the phase shifter 362. The phase shifter 362 is located on the feedback transmission line 390, and, in accordance with the embodiment of the present invention, may include impedance elements, such as a switch and/or a diode.

Figure 6:
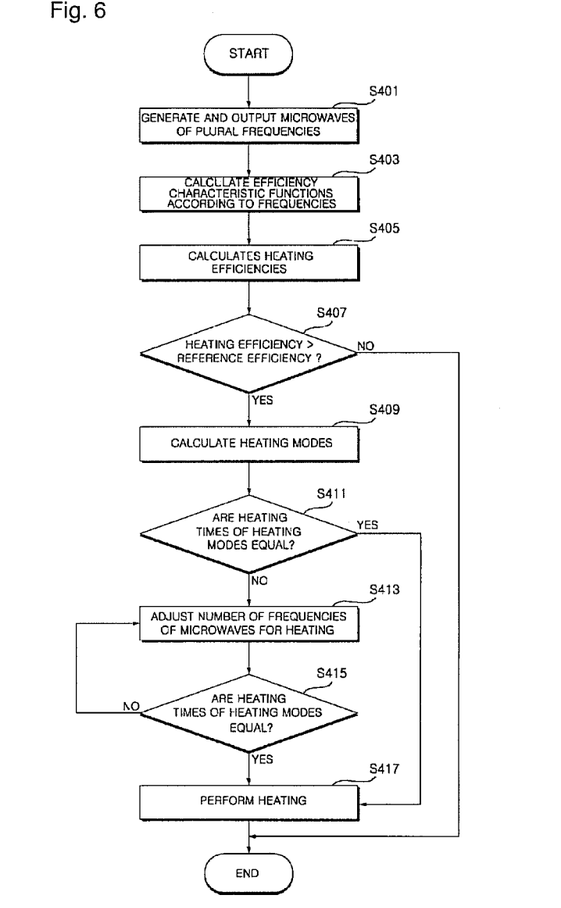
FIG. 6 is a flow chart illustrating an operating method of a cooking apparatus using microwaves in accordance with one embodiment of the present invention.

FIG. 6 is a flow chart illustrating an operating method of a cooking apparatus using microwaves in accordance with one embodiment of the present invention.

With reference to FIG. 6, the microwave generator 110 of the cooking apparatus in accordance with the embodiment of the present invention generates and outputs microwaves of a plurality of frequencies (S401).

The frequency oscillator 332 of the microwave generator 110 oscillates microwaves of a corresponding frequency according to a frequency control signal from the microwave controller 350.

The level adjustment unit 334 outputs the microwaves with corresponding power according to a power control signal from the microwave controller 350. The level adjustment unit 334, during the heating session, receives the same power control signal for the microwaves of the respective frequencies from the microwave controller 350, and thus outputs a regular power level for the microwaves of the plurality of frequencies.

Figure 7:
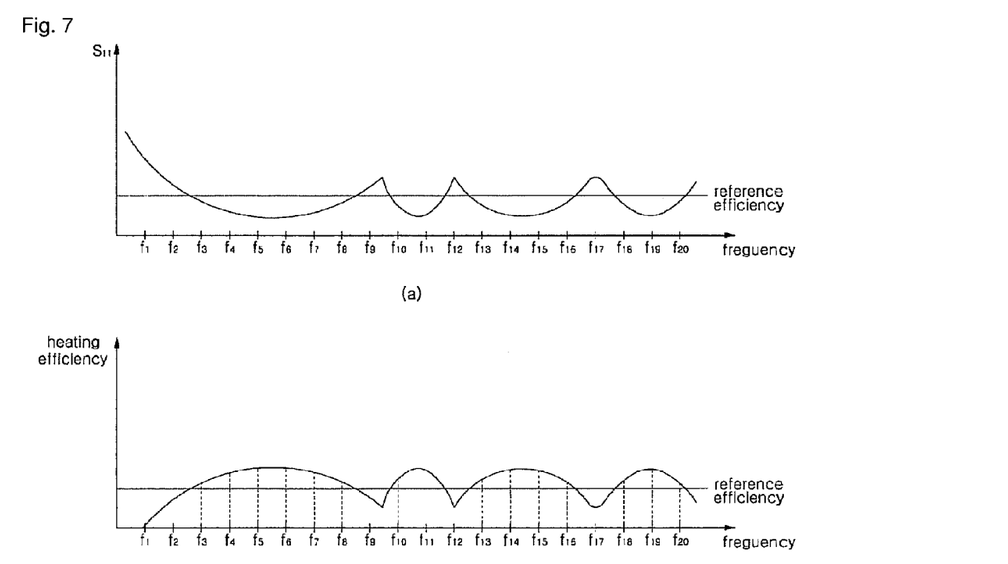
FIG. 7(a) is a graph illustrating efficiency characteristic functions according to frequencies in accordance with the embodiment of the present invention.
FIG. 7(b) is a graph illustrating heating efficiencies according to frequencies in accordance with the embodiment of the present invention.

The microwave controller 350 of the cooking apparatus using microwaves in accordance with the embodiment of the present invention sweeps microwaves of various frequencies, and thus calculates efficiency characteristic functions (for example, S-parameter, S11, reflecting efficiencies) according to frequencies (S403). This will be described later with reference to FIG. 7(a).

The microwave controller 350 calculates heating efficiencies according to frequencies based on the calculated efficiency characteristic functions according to frequencies (S405).

That is, the microwave controller 350 may calculate the heating efficiencies according to frequencies based on microwaves, which are not absorbed by the object in the cavity 134, instead being reflected by the object, from among microwaves discharged to the inside of the cavity 134.

That is, the microwave controller 350 calculates heating efficiencies of the microwaves of the plural frequencies based on a received feedback signal. Here, the microwave controller 350 may judge that, if a feedback signal to microwaves of each frequency is small, heating efficiency of the microwaves is high. This will be described later with reference to FIG. 7(b).

The microwave controller 350 compares the heating efficiencies with a reference efficiency, and thus calculates microwaves for heating, the heating efficiencies of which are higher than the reference efficiency (S407).

The microwave controller 350 calculates the microwaves for heating, the heating efficiencies of which are higher than the reference efficiency, and calculates heating modes consisting of the calculated microwaves for heating (S409).

The microwave controller 350 calculates heating times according to the heating modes consisting of the calculated microwaves for heating, and thus judges whether or not the heating times in the respective heating modes are equal (S411).

Since the equal heating time of the heating modes means that equal energy is applied in the respective heating modes so as to uniformly heat the object, upon judging that the heating times in the respective heating modes are equal, heating is continuously performed (S417).

On the other hand, upon judging that the heating times in the respective heating modes are not equal, the microwave controller 350 adjusts the number of the frequencies of the microwaves for heating according to the heating modes in accordance with the embodiment of the present invention so as to equalize the heating times of the heating modes (S413), and then recalculates heating times according to the heating modes, and judges whether or not the heating times in the respective heating modes are equal (S415).

Adjustment of the number of the frequencies of the microwaves for heating may be achieved through a method of repeating the heating modes, a method of decreasing the number of the frequencies of the microwaves for heating in specific heating modes, and a method of increasing the number of the frequencies of the microwaves for heating in specific heating modes.

Instead of adjustment of the number of the frequencies of the microwaves for heating, heating times of the microwaves for heating in specific heating modes may be adjusted so that the heating modes may have the equal heating time.

Since the equal heating time of the heating modes means that equal energy is applied in the respective heating modes so as to uniformly heat the object, upon judging that the heating times in the respective heating modes are equal, heating is continuously performed (S417).

Upon judging that the heating times in the respective heating modes are not equal, the microwave controller 350 readjusts the number of the frequencies of the microwaves for heating according to the heating modes in accordance with the embodiment of the present invention (S413).

FIGS. 7(a) to 9 illustrate one example of the operating method of the cooking apparatus using microwaves in accordance with the embodiment of the present invention.

Figure 8:
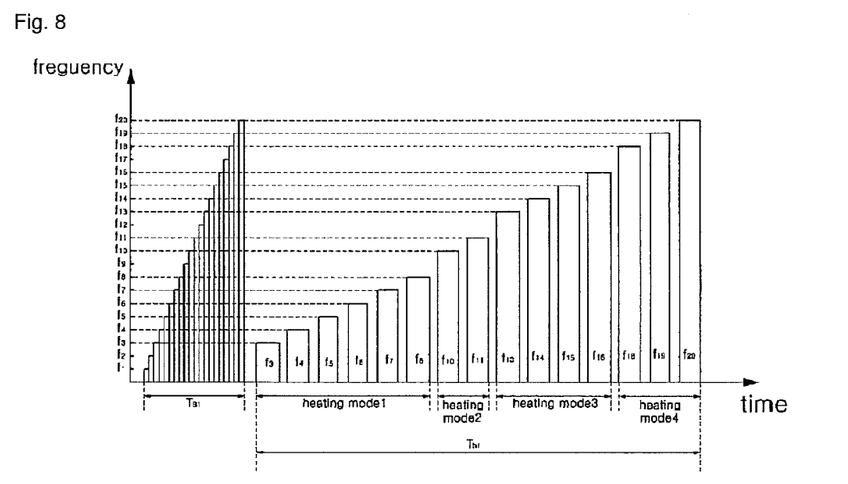
FIG. 8 is a graph illustrating a frequency scanning process and a heating process according to time in accordance with the embodiment of the present invention.
Figure 9:
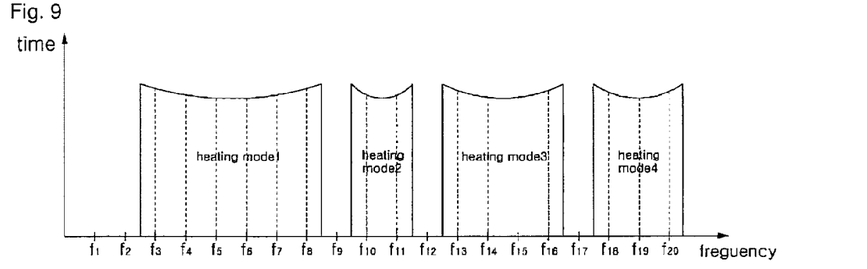
FIG. 9 is a graph illustrating heating modes and heating times according to frequencies in accordance with the embodiment of the present invention.

FIG. 7(a) is a graph illustrating efficiency characteristic functions (for example, S-parameter, S11, reflecting efficiencies) according to frequencies in accordance with the embodiment of the present invention, FIG. 7(b) is a graph illustrating heating efficiencies according to frequencies in accordance with the embodiment of the present invention, FIG. 8 is a graph illustrating a frequency scanning process and a heating process according to time in accordance with the embodiment of the present invention, and FIG. 9 is a graph illustrating heating modes in accordance with the embodiment of the present invention.

First, FIG. 7(a) illustrates one example of efficiency characteristic functions (for example, S-parameter, S11, reflecting efficiencies) according to frequencies calculated by the microwave controller 350.

The microwave controller 350 of the cooking apparatus using microwaves may sweep microwaves of various frequencies and calculate the efficiency characteristic functions (for example, S-parameter, S11, reflecting efficiencies) according to frequencies.

With reference to FIG. 7(a), microwaves having frequencies f3 to f8, f10, f11, f13 to f16 and f18 to f20 have values lower than a reference S11 value, and microwaves having frequencies f1, f2, f9, f12 and f17 have values higher than the reference S11 value.

S11 values in accordance with the embodiment of the present invention are referred to as the efficiency characteristic functions (for example, S-parameter, S11, reflecting efficiencies) according to frequencies, and are values expressed as a ratio of microwaves, which are not absorbed by the object in the cavity 134, instead being reflected by the object, to microwaves discharged to the inside of the cavity 134 when an object within the cavity 134 is heated by microwaves output from the generator. As the S11 value is smaller, the heating efficiency is larger.

When a load within the cavity 134 is heated, the microwave controller 350 of the cooking apparatus may heat the load using the microwaves for heating having frequencies, the S11 values of which are lower than the reference S11 value, as shown in FIG. 7(a).

FIG. 7(b) illustrates a heating efficiency curve using the S11 values shown in FIG. 7(a).

The microwave controller 350 may calculate heating efficiencies according to frequencies based on the calculated efficiency characteristic functions according to frequencies (S405).

That is, the microwave controller 350 may calculate the heating efficiencies based on the microwaves, which are not absorbed by the object in the cavity 134, instead being reflected by the object, from among microwaves discharged to the inside of the cavity 134.

That is, the microwave controller 350 calculates heating efficiencies of microwaves of the plural frequencies based on a received feedback signal. Here, the microwave controller 350 may judge that, if the feedback signal to microwaves of each frequency is small, heating efficiency of the microwaves is high.

In accordance with the embodiment, as the S11 value is smaller, the heating efficiency is larger, and as the S11 value is larger, the heating efficiency is smaller. With reference to FIG. 7(b), the microwaves having the frequencies f3 to f8, f10, f11, f13 to f16 and f18 to f20 have heating efficiencies higher then the reference efficiency, and the microwaves having frequencies the f1, f2, f9, f12 and f17 have heating efficiencies lower than the reference efficiency.

If the microwaves having heating efficiencies higher than the reference efficiency are interposed between the microwaves having heating efficiencies lower than the reference efficiency, a set of the microwaves having heating efficiencies higher than the reference efficiency is referred to as a heating mode.

With reference to FIG. 7(b), a set of the microwaves having the frequencies f3 to f8 is referred to as a heating mode 1, and a set of the microwaves having the frequencies f10 and f11 is referred to as heating mode 2. Further, a set of the microwaves having the frequencies f13 to f16 is referred to as a heating mode 3, and a set of the microwaves having the frequencies f18 to f20 is referred to as a heating mode 4).

FIG. 8 illustrates a first scanning process and a heating process of the operating method of the cooking apparatus using microwaves in accordance with the embodiment of the present invention.

Time of a first scanning session Ts1 represents time when the microwave controller 350 initially sweeps microwaves, and, in such scanning operation, the microwave controller 350 may scan microwaves of various frequencies and calculate heating efficiencies thereof.

As shown in FIG. 7(b), the microwave controller 350 heats the object 140 in the cavity 134 using the microwaves for heating having the frequencies f3 to f8, f10, f11, f13 to f16 and f18 to f20, the heating efficiencies of which are higher than the reference efficiency.

The object 140 in the cavity 134 may be heated using the microwaves for heating having the corresponding frequencies for time of a first heating session m1.

Since the heating efficiency of the microwaves having the frequency f8 is higher than the heating efficiency of the microwaves having the frequency f3, output time of the microwaves having the frequency f3 may be set to be longer than output time of the microwaves having the frequency f8.

Here, the heating session Th1 shown in FIG. 8 may be decided by user manipulation or kinds of the object within the cavity 134, a designated time delay may be present between the scanning session Ts1 and the heating session Th1, and the heating session Th1 may be longer than the scanning session Ts1. Further, the scanning session Ts1 and the heating session Th1 may be repeated during a cooking process using microwaves.

That is, the microwave controller 350, with respect to microwaves having high heating efficiency, may provide a frequency control signal to generate microwaves of a corresponding frequency to the frequency oscillator 332 of the microwave generator 110 for a short time, and, with respect to microwaves having low heating efficiency, provide a frequency control signal to generate microwaves of a corresponding frequency to the frequency oscillator 332 of the microwave generator 110 for a long time.

The frequency oscillator 332 generates corresponding microwave according to the frequency control signal provided by the microwave generator 350.

The level adjustment unit 334 adjusts a level corresponding to the amplitude of the microwaves generated by the frequency oscillator 332 according to a power control signal provided by the microwave controller 350.

Here, the equal power control signal for microwaves of all frequencies used in the heating session may be provided to the level adjustment unit 334 by the microwave controller 350. The amplifier 336 amplifies the microwaves, the levels of which are adjusted, the isolation unit (not shown) provides the amplified microwaves to the DC 338, the DC 338 provides the microwaves, provided by the isolation unit (not shown), to the microwave transmission unit 112, and the microwave transmission unit 112 outputs the microwaves, provided by the DC 338, to the inside of the cavity 134.

Since the number of frequencies of microwaves for heating is varied according to heating modes, heating times of the heating modes 1, 2, 3 and 4 are different. If the heating times of the microwaves according to frequencies are uniform, heating is performed for the longest time in the heating mode having a large number of frequencies of microwaves, and the object 140 to be heated in the cavity 134 may not be uniformly heated.

FIG. 9 is a graph illustrating heating modes in accordance with the embodiment of the present invention.

With reference to FIG. 9, microwaves for heating are divided into heating modes 1, 2, 3 and 4 based on heating efficiencies calculated using the efficiency characteristic functions (for example, S-parameter, S11, reflecting efficiencies) according to frequencies calculated by the microwave controller 350 of the cooking apparatus using microwaves.

The heating mode 1 consists of microwaves having the frequencies f3 to f8, and the heating mode 2 consists of microwaves having the frequencies f10 and f11. The heating mode 3 consists of microwaves having the frequencies f13 to f16, and the heating mode 4 consists of microwaves having the frequencies f18 to f20.

Since heating times of microwaves for heating having the respective frequencies are almost equal, heating times of the respective heating modes are varied according to the number of the frequencies of the microwaves forming the heating modes.

Figure 10:
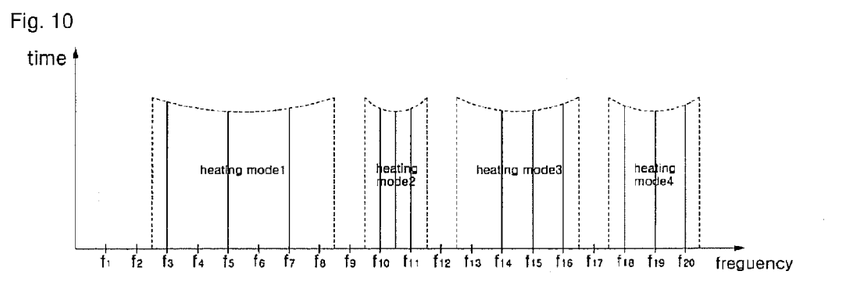
FIG. 10 is a graph illustrating heating modes and heating times, in which the numbers of frequencies of microwaves for heating are adjusted, in accordance with the embodiment of the present invention.

FIG. 10 is a graph illustrating heating modes and heating times, in which the numbers of frequencies of microwaves for heating are adjusted, in accordance with the embodiment of the present invention.

With reference to FIG. 10, for example, the heating mode 1 consists of microwaves having 6 frequencies, i.e., the frequencies f3 to f8, the heating mode 2 consists of microwaves having 2 frequencies, i.e., the frequencies f10 and f11, the heating mode 3 consists of microwaves having 4 frequencies, i.e., the frequencies f13 to f16, and the heating mode 4 consists of microwaves having 3 frequencies, i.e., the frequencies f18 to f20.

In order to allow the heating modes to have the same number of frequencies of microwaves, the microwave controller 350, in case of a heating mode consisting of microwaves for heating having a large number of frequencies, may omit some of the frequencies of the microwaves for heating.

On the other hand, the microwave controller 350, in case of a heating mode consisting of microwaves for heating having a small number of frequencies, may add other frequencies of microwaves for heating to the frequencies of the microwaves for heating forming the heating mode.

That is, since the heating times of the heating modes are different due to differences in the numbers of frequencies of microwaves for heating forming the heating modes, the microwave controller 350 of the cooking apparatus using microwaves adjusts the numbers of the frequencies of the microwaves for heating in all the heating modes so as to be equal, thereby allowing the respective heating modes to have the equal heating time.

For example, as shown in FIG. 10, the numbers of the frequencies of the microwaves for heating forming the heating modes are respectively 6, 2, 4 and 3, the numbers may be uniformly adjusted to 3.

For this purpose, in the heating mode 1 consisting of 6 frequencies of the microwaves for heating, microwaves having the frequencies f4, f6 and f8 are omitted and only microwaves having the frequencies f3, f5 and f7 are used in heating.

In the heating mode 2 consisting of 2 frequencies of the microwaves for heating, microwaves having a frequency are additionally selected and used in heating. Therefore, the microwave controller 350 may additionally select and use microwaves for heating having a frequency f10.5 between the frequencies f10 and f11.

In the heating mode 3 consisting of 4 frequencies of the microwaves for heating, microwaves having the frequency f13 are omitted and only microwaves having the frequencies f14, f15 and f16 are used in heating.

In the heating mode 4 consisting of 3 frequencies of the microwaves for heating, microwaves having the frequencies f18, f19 and f20 are intactly used in heating.

Figure 11:
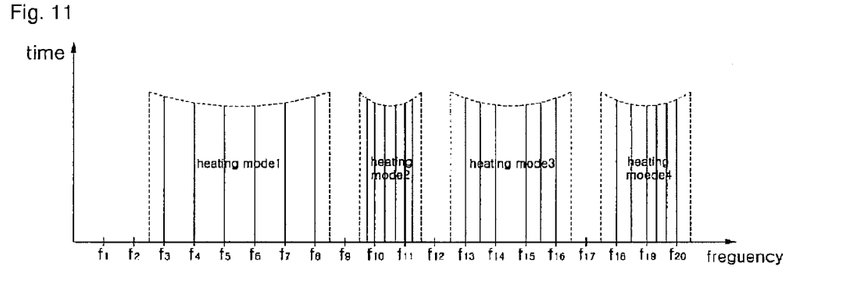
FIG. 11 is a graph illustrating heating modes and heating times, in which the numbers of frequencies of microwaves for heating are equalized, in accordance with the embodiment of the present invention.

FIG. 11 is a graph illustrating heating modes and heating times, in which the numbers of frequencies of microwaves for heating are equalized, in accordance with the embodiment of the present invention.

With reference to FIG. 10, the numbers of the frequencies of the microwaves for heating in the heating modes are adjusted to a designated value. On the other hand, with reference to FIG. 11, the microwave controller 350 may set the numbers of the frequencies of the microwaves for heating in the heating modes to the number of the frequencies of the microwaves for heating forming the heating mode, the heating time of which is longest, i.e., the maximum heating mode.

The maximum heating mode has the largest number of frequencies of microwaves and thus has the longest heating time.

With reference to FIG. 11, the heating mode 1 is the maximum heating mode. In this case, in the heating modes 2, 3 and 4, the heating times of which are shorter than the heating time of the heating mode 1, microwaves for heating having frequencies other than the microwaves having the frequencies belonging to the heating modes 2, 3 and 4 are additionally selected and used, and thus the heating times of the heating modes 2, 3 and 4 may coincide with the heating time of the maximum heating mode 1.

The additionally selected microwaves for heating may be selected using interpolated microwaves generated by the microwave generator 110 of the cooking apparatus using microwaves.

The microwave controller 350 may control the heating time of the heating mode having the longest heating and the heating times of other heating modes so as to be equal through adjustment of the number of frequencies of microwaves for heating according to the heating modes.

If the number of frequencies of calculated microwaves is at least two, the microwave controller 350 may set the number of frequencies of interpolated microwaves in proportion to the frequencies of the calculated microwaves.

For example, if a frequency interval between the microwaves output the inside of the cavity 134 during the scanning session is set to 2 MHz and a frequency interval between the microwaves output to the inside of the cavity 134 during the heating session is set to 500 kHz, the number of the frequencies of the interpolated microwaves may be set to 3 in proportion to the frequencies of the calculated microwaves during the scanning session.

Figure 12:
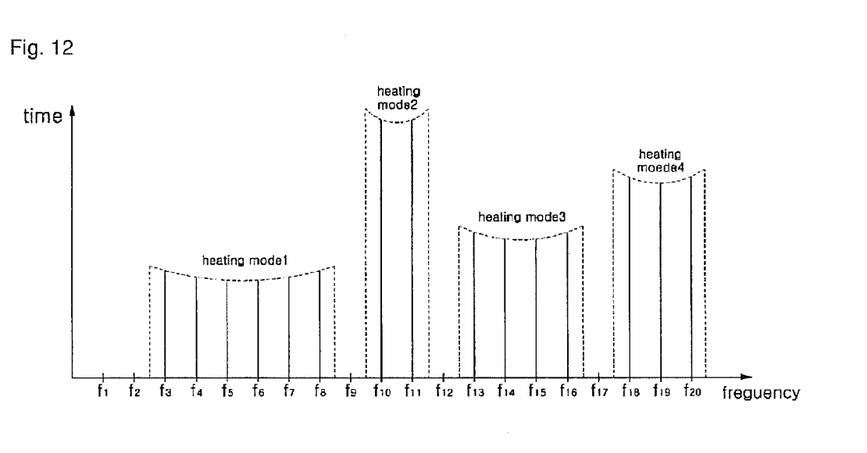
FIG. 12 is a graph illustrating relations between microwaves for heating in heating modes and time in accordance with the embodiment of the present invention.

FIG. 12 is a graph illustrating relations between microwaves for heating in heating modes and time in accordance with the embodiment of the present invention.

With reference to FIG. 12, for example, the heating mode 1 consists of microwaves having 6 frequencies, i.e., the frequencies f3 to f8, the heating mode 2 consists of microwaves having 2 frequencies, i.e., the frequencies f10 and f11, the heating mode 3 consists of microwaves having 4 frequencies, i.e., the frequencies f13 to f16, and the heating mode 4 consists of microwaves having 3 frequencies, i.e., the frequencies f18 to f20.

For example, since the heating mode 4 consists of microwaves having 3 frequencies and the heating mode 1 consists of microwaves having 6 frequencies, if the heating times of the microwaves having the respective frequencies are equal, heating time of the heating mode 1 is longer than heating time of the heating mode 4. However, as shown in FIG. 12, if the heating times of the microwaves having the frequencies forming the heating mode 4 are increased, the heating times of the heating modes may be equalized.

That is, the microwave controller 350 of the cooking apparatus using microwaves extends the heating times of the microwaves having the respective frequencies in the heating mode consisting of microwaves having a small number of frequencies, thereby allowing the heating modes to have the equal heating time and allowing equal energy to be applied to the respective heating modes.

Figure 13:
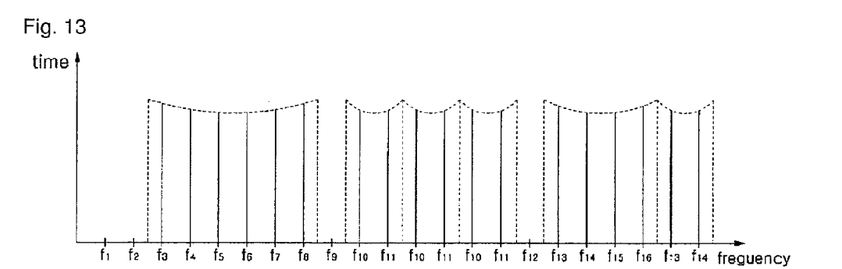
FIG. 13 is a graph illustrating relations between microwaves for heating in heating modes and time in accordance with the embodiment of the present invention.

FIG. 13 is a graph illustrating relations between microwaves for heating in the heating modes and time in accordance with the embodiment of the present invention.

With reference to FIG. 13, for example, the heating mode 1 consists of microwaves having 6 frequencies, i.e., the frequencies f3 to f8, the heating mode 2 consists of microwaves having 2 frequencies, i.e., the frequencies f10 and f11, the heating mode 3 consists of microwaves having 4 frequencies, i.e., the frequencies f13 to f16, and the heating mode 4 consists of microwaves having 3 frequencies, i.e., the frequencies f18 to f20.

If the heating times of the microwaves having the respective frequencies in the respective heating modes are equal, the numbers of the frequencies of the microwaves in the heating modes are different and thus the heating times of the heating modes are different.

Therefore, as shown in FIG. 13, the numbers of the frequencies of the microwaves in the heating modes are equalized by repeating the heating mode having a small number of the frequencies of the microwaves, thereby allowing the heating modes to have the equal heating time and allowing equal energy to be applied to the respective heating modes.

For example, since the heating mode 1 consists of microwaves having 6 frequencies and the heating mode 2 consists of microwaves having 2 frequencies, if the heating mode 2 is repeated approximately three times, the heating mode 2 may have the equal heating time to that of the heating mode 1.

Figure 14:
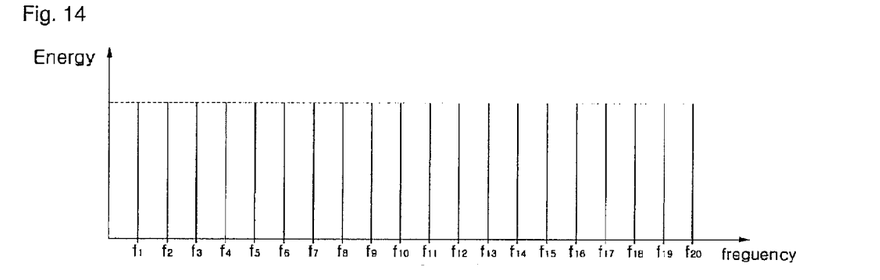
FIG. 14 is a graph illustrating heating energies according to microwaves for heating in accordance with the embodiment of the present invention.

FIG. 14 is a graph illustrating heating energies according to microwaves for heating in accordance with the embodiment of the present invention.

As shown in FIG. 14, heating energies due to microwaves for heating having the frequencies f1 to f20 are equal.

The microwave generator 110 of the cooking apparatus using microwaves outputs uniform energy of microwaves having respective frequencies during the heating session. If uniform energy of microwaves having respective frequencies is output, energies according to the heating modes may be equalized by adjusting the number of frequencies of microwaves for heating in the heating modes and heating times of the heating modes.

When energies according to the heating modes are equalized, the object 140 to be heated in the cavity 134 may be uniformly heated.

The above-described various control operations as performed by the microwave controller 350 may be performed by the controller 310.

That is, the controller 310 may calculate heating efficiencies according to frequencies using microwaves reflected by the inside of the cavity from among microwaves output to the inside of the cavity and thus calculate heating modes consisting of microwaves for heating in the scanning session, and control the heating modes so as to achieve the equal heating time in the heating session.

Further, the controller 310 may adjust the numbers of the frequencies of the microwaves for heating in the respective heating modes so that the heating modes have the equal heating time.

Further, the controller 310 may coincide the numbers of the frequencies of the microwaves for heating in other heating modes with the number of the frequencies of the microwaves for heating in the maximum heating mode having the largest number of the frequencies of the microwaves for heating so that the heating modes have the equal heating time.

Further, the controller 310 may adjust the numbers of the frequencies of the microwaves for heating using frequencies of interpolated microwaves, generated by the microwave generator 110 to interpolate the frequencies of calculated microwaves, in the heating modes except for the maximum heating mode so that the respective heating modes have the equal heating time.

Further, the controller 310 may adjust heating time of microwaves having at least one frequency in the heating modes so that the heating modes have the equal heating time.

Further, the controller 310 may repeat a specific heating mode from among the heating modes so that the heating modes have the equal heating time.

Although the embodiment of the present invention describes the cooking apparatus using microwaves, the present invention is not limited thereto and the cooking apparatus using microwaves may be combined with various cooking apparatuses. As one example, the cooking apparatus using microwaves in accordance with the embodiment of the present invention may be combined with an oven-type cooking apparatus using a heater as a heating source. Further, as another example, the cooking apparatus using microwaves in accordance with the embodiment of the present invention may be combined with a cooking apparatus using an induction heater as a heating source. Further, as a further example, the cooking apparatus using microwaves in accordance with the embodiment of the present invention may be combined with a cooking apparatus using a magnetron as a heating source.

The cooking apparatus in accordance with the present invention is not limited to configurations and methods of the above-described embodiments, and all or some of the respective embodiments may be selectively combined so as to achieve various modifications.

Effects of the present invention are not limited to the above-stated effects, and those skilled in the art will understand other effects, which are not stated above, from the accompanying claims.

Although the embodiments of the present invention have been disclosed for illustrative purposes, those skilled in the art will appreciate that various modifications and applications are possible, without departing from the scope and spirit of the invention as disclosed in the accompanying claims. For example, the respective elements described in detail in the embodiments may be modified. Further, it will be understood that differences relating to such modifications and applications are within the scope of the invention defined in the accompanying claims.

INDUSTRIAL APPLICABILITY

The present invention is applied to a cooking apparatus using microwaves.

The invention claimed is:
1. A cooking apparatus, comprising:
a cavity; and
a microwave generator to generate and output microwaves of a plurality of frequencies to heat an object within the cavity, wherein the microwave generator includes a controller:
to calculate heating efficiencies of the microwaves according to the plurality of frequencies based on microwaves, which are not absorbed by the object in the cavity, instead being reflected by the object, from among the microwaves discharged to the inside of the cavity;
to compare the heating efficiencies of the microwaves with a reference efficiency and to calculate microwaves for heating, the heating efficiencies of which are higher than the reference efficiency;

to calculate heating times according to a plurality of heating modes in a heating session consisting of the microwaves for heating, during a scanning session, wherein the plurality of heating modes are classified based on a frequency range of the microwaves for heating; and to control the heating times to be equal in the plurality of heating modes during the heating session, and wherein the microwave generator further includes:

a frequency oscillator to output first microwaves of a corresponding frequency based on a frequency control signal from a microwave controller;

a level adjuster having a Voltage Controlled Attenuator (VCA) and that adjusts a power of the first microwaves based on a power control signal for the controller to output second microwaves; and an amplifier to amplify the second microwaves, which are used to heat the object within the cavity.

2. The cooking apparatus according to claim 1, wherein the controller adjusts a number of frequencies of the microwaves for heating in the plurality of heating modes so that the heating modes have the equal heating time.

3. The cooking apparatus according to claim 1, wherein the controller adjusts a number of frequencies of the microwaves for heating in heating modes other than a maximum heating mode having a largest number of the frequencies of the microwaves based on the maximum heating mode so that the heating modes have the equal heating time.

4. The cooking apparatus according to claim 1, wherein the controller adjusts a number of the frequencies of the microwaves using frequencies of interpolated microwaves, generated by the microwave generator to interpolate the frequencies of the calculated microwaves, in the heating modes other than a maximum heating mode so that the heating modes have the equal heating time.

5. The cooking apparatus according to claim 1, wherein the controller adjusts the heating times of the microwaves having at least one frequency in the heating modes so that the heating modes have the equal heating time.

6. The cooking apparatus according to claim 1, wherein the controller repeats a specific heating mode from among the heating modes so that the heating modes have the equal heating time.

7. The cooking apparatus according to claim 1, wherein the microwave generator outputs energy having uniform intensity for the microwaves of frequencies corresponding to a selected mode during the heating session.

8. The cooking apparatus according to claim 1, further including a microwave transmitter to transmit the microwaves of the plurality of frequencies, generated by the microwave generator, to the inside of the cavity.

9. The cooking apparatus according to claim 1, wherein the microwave generator further includes a directional coupler to transmit the microwaves output from the microwave generator to the inside of the cavity and to receive the microwaves reflected by the inside of the cavity.

10. The cooking apparatus according to claim 9, wherein the direction coupler includes a first power detector to detect power of the output microwaves and a second power detector to detect power of the reflected microwaves reflected by the inside of the cavity.

11. The cooking apparatus according to claim 10, wherein the microwave generator further includes an isolator provided between the amplifier and the direction coupler to pass through the microwaves output from the amplifier if the amplified microwaves are transmitted to the cavity, and to intercept the microwaves reflected by the inside of the cavity.

12. The cooking apparatus according to claim 1, further including:

a main body having the cavity;

a door connected to a front surface of the main body to open and close the cavity; and an operation panel connected to one side of the front surface of the main body.

13. The cooking apparatus according to claim 12, wherein the operation panel includes an input to control operation of the cooking apparatus and a display to display an operating status of the cooking apparatus.

14. The cooking apparatus according to claim 13, wherein the controller controls the display to display the operating status of the cooking apparatus.

15. The cooking apparatus according to claim 1, further including a power supply to supply power to the microwave generator.

* * * * *